US007552780B2

(12) United States Patent
Glauning et al.

(10) Patent No.: US 7,552,780 B2
(45) Date of Patent: Jun. 30, 2009

(54) ELECTRIC HAND MACHINE-TOOL AND POWER SUPPLY MODULE FOR AN ELECTRIC HAND MACHINE TOOL

(75) Inventors: Rainer Glauning, Aichtal-Groetzingen (DE); Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 10/552,214

(22) PCT Filed: Jan. 31, 2005

(86) PCT No.: PCT/EP2005/050380

§ 371 (c)(1), (2), (4) Date: Oct. 6, 2005

(87) PCT Pub. No.: WO2005/087450

PCT Pub. Date: Sep. 22, 2005

(65) Prior Publication Data

US 2006/0199073 A1 Sep. 7, 2006

(30) Foreign Application Priority Data

Mar. 12, 2004 (DE) ...................... 10 2004 012 071

(51) Int. Cl.
*H01M 2/10* (2006.01)

(52) U.S. Cl. ...................................... 173/171; 173/217

(58) Field of Classification Search ................. 173/171, 173/217; 310/47, 50
See application file for complete search history.

(56) References Cited

U.S. PATENT DOCUMENTS 3,952,239 A * 4/1976 Owings et al. .............. 320/113
3,973,179 A * 8/1976 Weber et al. ................ 320/113
3,999,110 A * 12/1976 Ramstrom et al. .......... 320/112
5,122,427 A * 6/1992 Flowers et al. ................ 429/97
5,144,217 A * 9/1992 Gardner et al. .............. 320/110
5,368,954 A 11/1994 Bruns
5,671,815 A 9/1997 Kabatnik et al.
6,304,058 B2 * 10/2001 Watson et al. ............... 320/117

(Continued)

FOREIGN PATENT DOCUMENTS

CN 2566999 8/2003

(Continued)

*Primary Examiner*—Brian D Nash
(74) *Attorney, Agent, or Firm*—Michael J. Striker

(57) ABSTRACT

An electric power tool and a power supply module for interchangeable attachment to an electric power tool are disclosed. The electric power tool has a tool housing (12) with a guide sleeve (15) for interchangeably receiving the power supply module (11), which has an introduction opening (152) and an electrical interface. To achieve high resistance to vibration of the contacting at the module/tool interface, at least one form-locking element (21) for making a form lock with the power supply module (11) is located in the end region, remote from the introduction opening of the guide sleeve (15). The power supply module (11) has a module housing (13), which receives a battery and an introduction dome (14), formed integrally onto the module housing, for guiding the tool, on which dome there is an electrical interface with the electric power tool and at least one form-locking element for making a form lock with the tool housing (15) is located (FIG. 2).

20 Claims, 2 Drawing Sheets

U.S. PATENT DOCUMENTS 6,357,534 B1 * 3/2002 Buetow et al. .............. 173/217
6,573,621 B2 * 6/2003 Neumann ................... 307/150
6,729,413 B2 * 5/2004 Turner et al. ................ 173/217
2002/0067080 A1 * 6/2002 Neumann ................... 307/150
2006/0113100 A1 * 6/2006 Hsu et al. ................... 173/217
2006/0244318 A1 * 11/2006 Glauning et al. .............. 310/50

FOREIGN PATENT DOCUMENTS

| | | | |
|---|---|---|---|
| DE | 195 21 426 | | 12/1996 |
| DE | 295 13 651 | U1 | 2/1997 |
| FR | 2 623 345 | | 5/1989 |

* cited by examiner

ELECTRIC HAND MACHINE-TOOL AND POWER SUPPLY MODULE FOR AN ELECTRIC HAND MACHINE TOOL

CROSS-REFERENCE

The invention described and claimed hereinbelow is also described in PCT/EP 2005/050380, filed on Jan. 31, 2005, and DE 102004012071.4, filed Mar. 12, 2004. This German Patent Application, whose subject matter is incorporated here by reference, provides the basis for a claim of priority of invention under 35 U.S.C. 119 (a)-(d).

BACKGROUND OF THE INVENTION

The invention is based on an electric power tool and on a power supply module.

In cordless electric power tools, such as battery-operated drills or screwdrivers, a power supply module, known as a battery pack, is located on the underside of the handle formed integrally onto the tool housing, and this module, for fast replacement and automatic contacting, is equipped with an introduction dome that extends in the axial direction of the handle and that can be inserted into a guide sleeve located in the handle of the tool housing. There are electrical contacts, connected to the battery, on the introduction dome that at the end of the insertion process contact electrical contacts located in the tool housing, so that the electrical coupling of the tool to the battery at the tool-module interface is automatically established as the battery pack is attached to the tool. For ease of handling when the battery pack is being replaced, the battery pack must be introduced carefully; the prerequisite for this is that the introduction dome be slightly caught by the guide sleeve, which can be achieved by providing sufficient looseness or play in the region of the introduction opening of the guide sleeve. For reliable electrical contacting at the battery pack-tool interface during tool operation, conversely, tight reception of the introduction dome in the guide sleeve with as little play as possible is necessary. To meet these demands, the inner wall of the guide sleeve is provided with interception ribs, and the outer wall of the introduction dome is provided with corresponding groovelike rib receptacles.

SUMMARY OF THE INVENTION

The electric power tool of the invention has the advantage that the at least one form-locking element, located on the end of the introduction sleeve remote from the introduction opening, which form-locking element may be embodied as a rib or a recess and can correspond with a counterpart element on the power supply module, establishes a form lock with the inserted power supply module, which assures a firm, play-free seat of the power supply module in the tool housing, so that the contacts, contacting one another at the electrical interface, of the power supply module and the tool housing do not shift relative to one another or briefly lift away from one another even upon severe vibration of the electric power tool, so that high resistance to vibration and closure of the contacts is achieved. Since the freedom from play is established by the form-locking element at the end of the guide sleeve remote from the introduction opening, the interception ribs and rib receptacles acting as aids in guidance may be provided with great play in the region of the introduction opening of the guide sleeve, to assure easy interception of the power supply module upon its attachment to the tool housing, and thus to improve handling when changing the power supply module.

The power supply module of the invention has the advantage that the at least one form-locking element located on the free end of the introduction dome, which element may be embodied as a recess or rib, makes a form lock with the tool housing that assures a firm, play-free seat of the power supply module in the tool housing. Since the freedom from play of the form-locking element is established on the free end in the contact region of the introduction dome, the contacts, contacting one another in the electrical interface, of the power supply module and the tool housing cannot shift counter to one another or briefly lift from one another, so that high resistance to vibration and closure of the contacts is achieved.

In an advantageous embodiment of the invention, the form-locking element is a recess located in the side wall of the introduction dome, which recess extends into the open on the free end of the introduction dome. Because the recess extends into the end face of the introduction dome, the end face of the introduction dome is reduced in size. Because of the reduced-size end face, the risk of soiling is also reduced, since a smaller end face is less vulnerable to soiling of the kind that occurs when the electric power tool is used at a construction site, for instance.

In an advantageous embodiment of the invention, two recesses are provided on the introduction dome, and the recesses are located mirror-symmetrically to one another, and the plane of symmetry extends through the longitudinal axes of the introduction dome. Because of this structural design, as the power supply module drops into place, a symmetrical load distribution at the module-tool interface is obtained.

BRIEF DESCRIPTION OF THE DRAWINGS

The invention is described in further detail in the ensuing description in terms of an exemplary embodiment shown in the drawing. Shown are.

DETAILED DESCRIPTION OF THE EXEMPLARY EMBODIMENT

Figure 1:
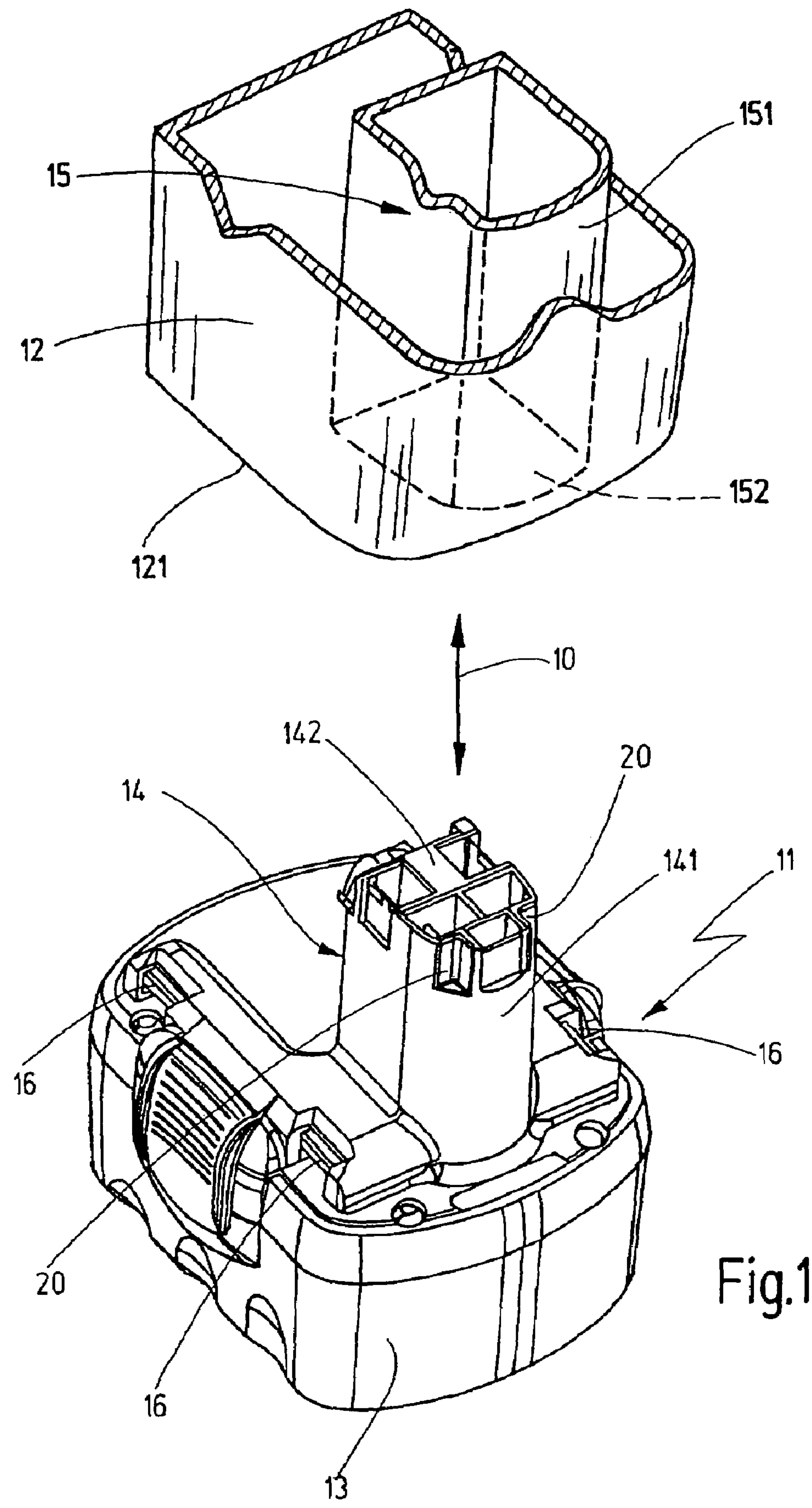
FIG. 1, a perspective view from below of a power supply module for an electric power tool, in association with a tool housing, shown in fragmentary form represented by a lower end of the handle, of an electric power tool.

In FIG. 1, a power supply module 11, also called a battery pack, for an electric power tool, such as a battery-operated power drill or a battery-operated screwdriver, is shown in a view from below. Of the electric power tool, what is shown is the lower end of the tool housing 12, shaped here into a handle, in perspective in association with the power supply module 11. By means of an axial attachment motion in the direction of the arrow 10 in FIG. 1, the power supply module 11 is attached to the tool housing 12 and taken off again from the tool housing 12 for changing; after the power supply module 11 is attached and the module 11 is locked to the tool housing 12, the electric motor of the electric power tool is automatically coupled to the power supply module 11.

The power supply module 11 has a module housing 13, which receives a battery or an accumulator (rechargeable battery); an introduction dome 14 protruding at a right angle is formed integrally onto the underside, oriented toward the tool housing 12, of the power supply module. A guide sleeve 15 is embodied in the tool housing 12; it is shown only schematically and in fragmentary form in FIG. 1, but in FIGS. 2 and 3 it can be seen in its constructed design in fragmentary form. The guide sleeve 15 has an introduction opening 152 and, on its end remote from the introduction opening, it has electrical contacts, to which the electric motor of the electric power tool is connected. Upon attachment of the power supply module 11 to the tool housing 12, the introduction dome 14 is inserted axially into the guide sleeve 15, until the module housing 13 strikes the lower end edge 121 of the tool housing 12, and clips provided on the tool housing 12 snap into detent recesses 16 that are embodied on the module housing 13. Electrical contacts 17 (FIGS. 2 and 3) are located on the free end of the introduction dome 14 and are connected to the battery or the accumulator in the module housing 13. At the end of the insertion motion of the introduction dome 14, these contacts 17 contact the contacts located in the tool housing 12.

Although not shown in detail here, to aid in introducing the introduction dome 14 into the guide sleeve 15, interception ribs are disposed on the one hand on the inner wall of the guide sleeve 15, extending axially as far as the introduction opening of the guide sleeve 15, and corresponding groovelike rib receptacles are machined into the outer wall 141 of the introduction dome 14 on the other hand; they end at the free end of the introduction dome 14 and each receives one of the interception ribs with displacement play by form-locking engagement. To achieve a good seat of the power supply module 11 on the tool housing 12 after the insertion of the introduction dome 14 into the guide sleeve 15 and to achieve a largely play-free fixation of the end portion of the introduction dome 14 in the guide sleeve 15 so as to enhance the vibration resistance of the contacting at the module-tool interface, the guide sleeve 15 and the introduction dome 14 have form-locking elements that correspond with one another and that are located respectively on the end, remote from the introduction opening, of the guide sleeve 15 and on the free end of the introduction dome 14, so that they come into engagement with one another only toward the end of the insertion travel of the introduction dome 14. The at least one form-locking element on the guide sleeve 15 is embodied as an axially oriented rib 21, which protrudes from the side wall of the guide sleeve 15 and which extends, from the end of the guide sleeve 15 remote from the introduction opening, over only a short end portion of the guide sleeve 15. The at least one form-locking element on the introduction dome 14 is embodied as a recess, which is made in the side wall of the introduction dome 14 and comes to an end in the open on the free end of the introduction dome 14. The recess 20 and the rib 21 can be seen in FIG. 2.

Figure 2:
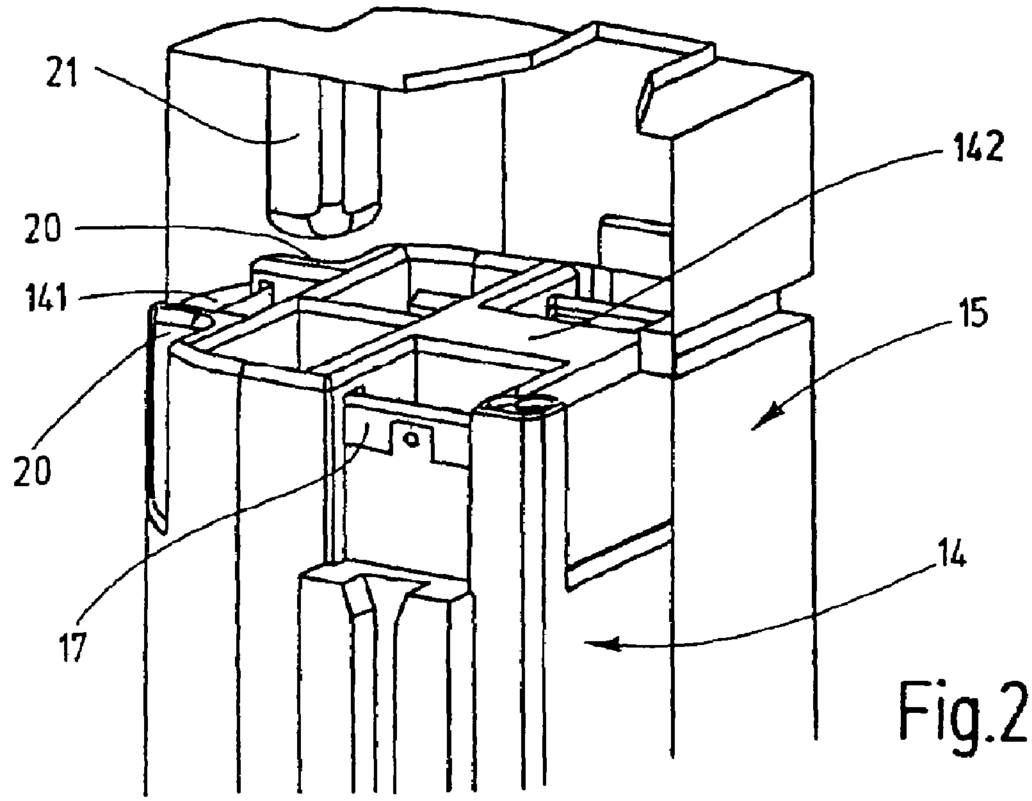
FIGS. 2 and 3, each in fragmentary form, a perspective view of a guide sleeve embodied in the tool housing and of an introduction dome embodied in the power supply module, which dome is inserted partway (FIG. 2) and all the way (FIG. 3) into the guide sleeve.
Figure 3:
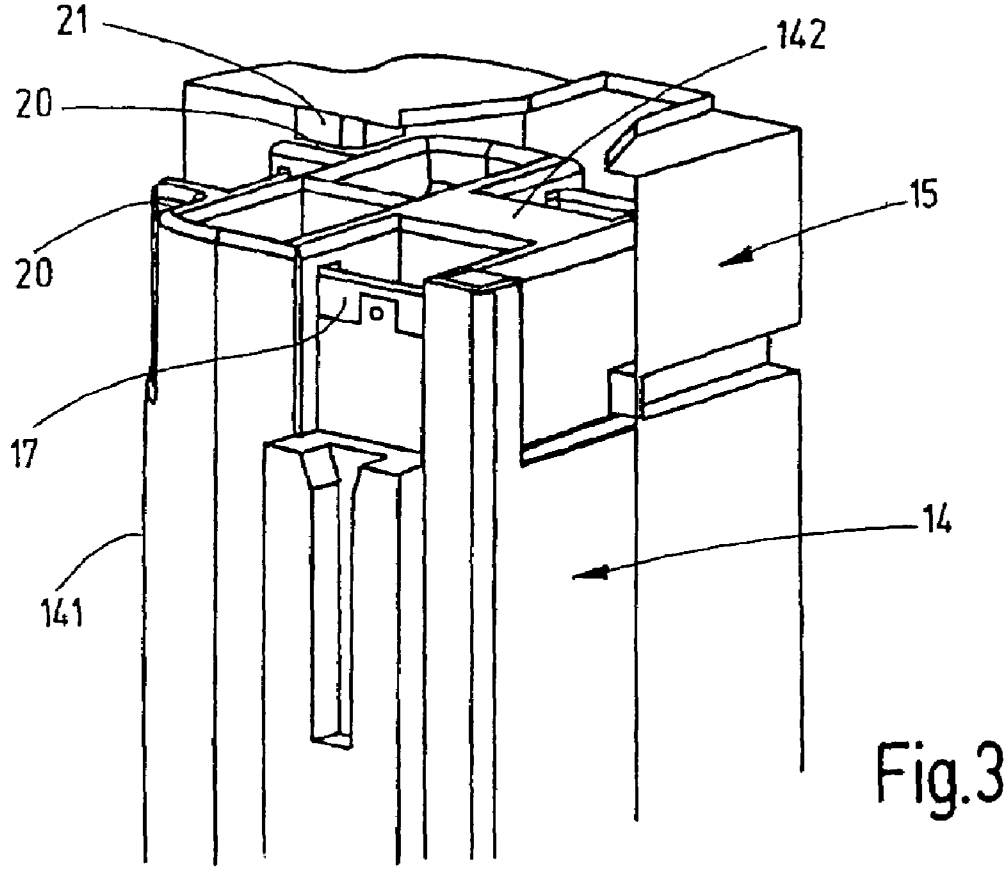

In the exemplary embodiment described, there are two recesses 20 and two ribs 21, each located mirror-symmetrically to one another on the introduction dome 14 and on the guide sleeve 15, respectively. Both the guide sleeve 15 and the introduction dome 14 have a boxlike profile, with a convex profile wall 151 and 141, respectively. The two recesses 20 are located mirror-symmetrically in the convex profile wall 141 of the introduction dome 14, and the two ribs 21 are located mirror-symmetrically in the convex profile wall 151 of the guide sleeve 15; the plane of symmetry extends through the longitudinal axes of the introduction dome 14 and of the guide sleeve 15, respectively. In FIGS. 2 and 3, the two recesses 20 coming to an end in the end face 142 of the introduction dome 14 can be seen, while of the two ribs 21, only one is shown. In FIG. 2, the introduction dome 14 is inserted only far enough into the guide sleeve 15 that the ribs 21 still do not dip into the recesses 20, while in FIG. 3, the introduction dome 14 is inserted all the way into the guide sleeve 15, and the ribs 21 are thus received in form-locking fashion in the recesses 20.

The ribs 21 are embodied in one piece with the guide sleeve 15 and have an axial length that is less than the axial length of the recesses 20. For the sake of favorable dipping of the ribs 21 into the recesses 20, which occurs toward the end of the insertion travel of the introduction dome 14, the end faces of the ribs 21 pointing toward the introduction opening 152 of the guide sleeve 15 are provided with rounded edges, as can be seen in FIG. 2 on the face end of the rib 21 pointing toward the introduction dome 14. The ribs 21 have a triangular cross section, and the recesses 20 correspondingly have a triangular inside cross section. However, the one tip of the cross sections is advantageously flattened, creating trapezoidal cross sections. The larger outline of the trapezoid of the inside cross section of the recesses 20 points toward the rib 21. The larger outline of the trapezoidal cross section of the rib 21 rests on the side wall of the guide sleeve 15.

The invention claimed is:

1. An electric power tool, having a tool housing (12) in which a guide sleeve (15) is formed for interchangeably receiving a power supply module (11) in an axial direction of insertion, the guide sleeve (15) having an introduction opening (152) and an electrical interface with the power supply module (11) and extending in the direction of insertion, wherein at least one form-locking element for producing a form lock with a form-locking element of the power supply module (11) is disposed in an end region of the guide sleeve facing away from the introduction opening (152) as viewed in the direction of insertion, wherein the at least one form-locking element is a rib (21) protruding from an inner wall of the guide sleeve (15), and wherein the rib (21) extends from the end, facing away from the introduction opening (152), of the guide sleeve (15) over only a limited portion of the guide sleeve (15) in such a manner that the rib (21) and the form-locking element of the power supply module (11) come into engagement with one another only toward an end of an insertion travel of the power supply module.

2. The electric power tool in accordance with claim 1, wherein the rib (21) is embodied in one piece with the guide sleeve (15).

3. The electric power tool in accordance with claim 1, wherein the end face of the rib (21) pointing toward the introduction opening (152) of the guide sleeve (15) has rounded edges and corners.

4. The electric power tool in accordance with claim 1, wherein the rib (21) has a triangular cross section.

5. The electric power tool in accordance with claim 1, wherein the rib (21) has a trapezoidal cross section, with a larger trapezoidal outline resting on the sheath wall.

6. The electric power tool in accordance with claim 1, wherein two ribs (21) spaced apart from one another are provided, which are located mirror-symmetrically to one another, and the plane of symmetry extends through the longitudinal axes of the guide sleeve (15).

7. The electric power tool in accordance with claim 6, wherein the guide sleeve (15) has a boxlike profile, with a convex profile wall (151), and that the ribs (21) are located in the convex profile wall (151).

8. The electric power tool in accordance with claim 1, having a mating power supply module for interchangeable attachment to the tool housing of the electric power tool in an axial direction of insertion, the power supply module having a module housing (13) that receives the battery or an accumulator and an introduction dome (14), for guiding the tool, formed integrally on the module housing and extending in the direction of insertion and on which there is an electrical interface with the electric power tool, wherein at least one form-locking element for producing a form lock with the tool housing (12) is located on a free end of the introduction dome (14), wherein the at least one form-locking element is a recess (20) located in the side wall of the introduction dome (14), and wherein the recess (20) extends in the direction of insertion into the open on the free end of the introduction dome (14) and over a limited portion of the introduction dome in such a manner that the recess (20) and the form-locking element of the power supply module (11) come into engagement with one another only toward an end of the insertion travel of the power supply module.

9. The electric power tool in accordance with claim 8, wherein the recess (20) has a trapezoidal inside cross section, with a larger trapezoidal outline pointing away from the introduction dome (14).

10. The electric power tool in accordance with claim 8, wherein two recesses (20) spaced apart from one another are provided, which are located mirror-symmetrically to one another, and the plane of symmetry extends through the longitudinal axis of the introduction dome (14).

11. The electric power tool in accordance with claim 10, wherein the introduction dome (14) has a boxlike profile, with a convex profile wall (141), and that the two recesses (20) are located in the convex profile wall (141).

12. The electric power tool in accordance with claim 8, wherein the recess (20) has a triangular inside cross section.

13. An electric power tool, having a tool housing (12) in which a guide sleeve (15) is formed for interchangeably receiving a power supply module (11) in an axial direction of insertion, the guide sleeve (15) having an introduction opening (152) and an electrical interface with the power supply module (11) and extending in the direction of insertion, wherein at least one form-locking element for producing a form lock with a form-locking element of the power supply module (11) is disposed in an end region of the guide sleeve facing away from the introduction opening (152) as viewed in the direction of insertion, wherein the at least one form-locking element is a rib (21) protruding from an inner wall of the guide sleeve (15), and wherein the rib (21) extends from the end region of guide sleeve facing away from the introduction opening (152) over only a limited portion of the guide sleeve (15) that is substantially less than half of a length of the guide sleeve, in such a manner that the rib (21) and the form-locking element of the power supply module (11) come into engagement with one another only toward an end of an insertion travel of the power supply module.

14. The electric power tool in accordance with claim 13, wherein two ribs (21) spaced apart from one another are provided, which are located mirror-symmetrically to one another, and the plane of symmetry extends through the longitudinal axes of the guide sleeve (15).

15. The electric power tool in accordance with claim 14, wherein the guide sleeve (15) has a boxlike profile, with a convex profile wall (151), and that the ribs (21) are located in the convex profile wall (151).

16. The electric power tool in accordance with claim 13, having a mating power supply module for interchangeable attachment to the tool housing of the electric power tool, the power supply module having a module housing (13) that receives the battery or an accumulator and an introduction dome (14), for guiding the tool, formed integrally on the module housing and on which there is an electrical interface with the electric power tool, wherein at least one form-locking element for producing a form lock with the tool housing (12) is located on a free end of the introduction dome (14), wherein the at least one form-locking element is a recess (20) located in the side wall of the introduction dome (14), and wherein the recess (20) has a triangular inside cross section and extends over a limited portion of the introduction dome as viewed in a longitudinal direction.

17. The electric power tool in accordance with claim 16, wherein the recess (20) extends into the open on the free end of the introduction dome (14).

18. The electric power tool in accordance with claim 16, wherein the recess (20) has a trapezoidal inside cross section, with a larger trapezoidal outline pointing away from the introduction dome (14).

19. The electric power tool in accordance with claim 16, wherein two recesses (20) spaced apart from one another are provided, which are located mirror-symmetrically to one another, and the plane of symmetry extends through the longitudinal axis of the introduction dome (14).

20. The electric power tool in accordance with claim 19, wherein the introduction dome (14) has a boxlike profile, with a convex profile wall (141), and that the two recesses (20) are located in the convex profile wall (141).

* * * * *